(12) United States Patent
Jamadagni et al.

(10) Patent No.: US 12,022,419 B2
(45) Date of Patent: Jun. 25, 2024

(54) SYSTEM AND METHOD FOR SUPPORTING STANDALONE 5G RADIO WITH LEGACY NETWORK

(71) Applicant: Jio Platforms Limited, Gujarat (IN)

(72) Inventors: Satish Nanjunda Swamy Jamadagni, Bangalore (IN); Mahesh Nayaka Mysore Annaiah, Bengaluru (IN); Vinay Kumar Shrivastava, Bangalore (IN); Mathew Oommen, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 334 days.

(21) Appl. No.: 17/597,715

(22) PCT Filed: Jul. 18, 2020

(86) PCT No.: PCT/IB2020/056781
§ 371 (c)(1),
(2) Date: Jan. 19, 2022

(87) PCT Pub. No.: WO2021/014328
PCT Pub. Date: Jan. 28, 2021

(65) Prior Publication Data
US 2022/0240211 A1    Jul. 28, 2022

(30) Foreign Application Priority Data

Jul. 19, 2019   (IN) ............................ 201921029172

(51) Int. Cl.
*H04W 60/04*   (2009.01)
*H04W 76/12*   (2018.01)
*H04W 76/20*   (2018.01)

(52) U.S. Cl.
CPC ........... *H04W 60/04* (2013.01); *H04W 76/12* (2018.02); *H04W 76/20* (2018.02)

(58) Field of Classification Search
CPC ..... H04W 60/04; H04W 76/12; H04W 76/20; H04W 48/12; H04W 92/02; H04W 60/00
See application file for complete search history.

(56) References Cited

U.S. PATENT DOCUMENTS

| 2018/0083688 A1* | 3/2018 | Agiwal | ................. H04M 3/537 |
| 2019/0124716 A1* | 4/2019 | Hapsari | ................... H04W 4/00 |
| 2021/0014916 A1* | 1/2021 | Raval | .................... H04W 92/02 |

FOREIGN PATENT DOCUMENTS

WO    WO 2018/172408 A1    9/2018

OTHER PUBLICATIONS

Orcale White paper—"5G architecture options full set", Jun. 15, 2016, (Url—https://telecoms.com/wp-content/blogs.dir/1/files/2016/06/5Garchitecture-options. pdf), p. 6.
(Continued)

*Primary Examiner* — Afshawn M Towfighi
(74) *Attorney, Agent, or Firm* — FINNEGAN, HENDERSON, FARABOW, GARRETT & DUNNER, LLP.

(57) ABSTRACT

The present invention relates to a system and a method for providing 5G services to at least one user device [302], The at least one user device [302] transmits a first connection request to the gNodeB [304], The gNodeB [304] attaches a first protocol message to the first connection request received from the at least one user device [302] and transmits the attached first connection request to an interworking unit [306], The interworking unit [306] generates a third request from the attached first connection request based on an application protocol and transmits the generated third request to an EPC [308], The EPC [308] establishes a connection with the at least one user device [302] and 5G services to the at least one user device [302] via the gNodeB [304].

15 Claims, 9 Drawing Sheets

(56) References Cited

OTHER PUBLICATIONS

International Search Report dated Nov. 13, 2020 in International Application No. PCT/IB2020/056781.

* cited by examiner

SYSTEM AND METHOD FOR SUPPORTING STANDALONE 5G RADIO WITH LEGACY NETWORK

CROSS-REFERENCE TO RELATED APPLICATIONS

This application is a U.S. national phase entry under 35 U.S.C. § 371 from PCT International Application No. PCT/IB2020/056781, filed Jul. 18, 2020, and claims foreign priority to IN201921029172, filed Jul. 19, 2019, the entire contents of which are incorporated herein by reference.

TECHNICAL FIELD

The present invention relates to wireless network, and more particularly, to provide 5G services to user device connected to the 5G New Radio (NR) network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In a traditional cellular deployment, service operators are now reinforcing their macro-cells deployment with one or multiple low powered small cellular cells (generally termed as Femto/Pico/Micro cells) placed at multiple strategic locations within one or more macro coverage areas. This kind of reinforced cellular network is generally termed as Heterogeneous Network, in short, HetNet. For a typical HetNet, strategic locations for small cells generally include areas with a high density of users, such as shopping malls, airports, railway/bus stations, colleges, etc. Also, these locations might include areas with dead-spots, or areas with low macro signal strength, such as indoor establishments or peripheral locations of a macro coverage area. HetNet provides increased mobile data capacity along with providing better mobile coverage, thereby enhancing the overall user's mobile broadband experience.

In the mobile communication network, it may often be difficult for the telecom operators to cater higher per user throughput and to maintain acceptable signal quality throughout the homogeneous deployment of only Macro Base Stations, in areas of high user density and/or high building penetration loss. The Small Base Station/Small Cell when used along with the Macro Base Stations serve the dual purpose of enhanced capacity and coverage as well as reduced capital expenditure or operational expenditure cost. The Small Cell is an umbrella term for low powered base-stations (access points) having a relatively smaller range compared to Macro Base Station and deployed in hotspots or covered indoor environments like homes, offices, shopping complexes etc. The service operator is increasingly deploying Small Base Stations in larger numbers to cater the localized area of high user density e.g. offices, shopping complexes etc., However, due to the increasing demand of the data speed for various applications and other network features, the next-generation 5G network is being implemented and tested worldwide.

While huge investments have been made in the 4G Technology, the telecom operators are continuously looking for solutions for the continuation of 4G evolution. With the release of the first version of the 5G specification, the industry has started developing 5G NR (New Radio) devices and network elements. 3GPP has specified Non-Stand Alone (NSA) mode for the immediate transition towards 5G and the Stand Alone (SA) mode as a final transition towards complete 5G. As the 5G core specifications are still evolving, the 5G Core (5GC) is far from mature. NSA mode is one in which the 5G base station will be connected with the EPC via 4G eNB. That means, 5G base station will be connected to eNB as a secondary Node.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide 5G services to at least one user device. Another object of the present invention is to provide support to the 5G NR NSA deployment which would use a fully functional 5G NR "Radio" catering to both data and signaling independently but connected to the existing 4G EPC core. Yet another object of the present invention is to provide a system and method to provide a novel mechanism to use the availability of the LTE and 5G NR Non-Access Stratum in a device to switch to a 5G NR node but use an existing 4G LTE EPC core.

In order to achieve at least some of the above-mentioned objectives, the present invention provides a method and system for filtering junk query in natural language processing. A first aspect of the present invention relates to a method for providing 5G services to at least one user device. The method comprising the at least one user device transmitting a first connection request to the gNodeB. Next, the gNodeB attaches a first protocol message to the first connection request received from the at least one user device and transmits the attached first connection request to an interworking unit. Subsequently, the interworking unit generates a third request from the attached first connection request based on an application protocol and transmits the generated third request to an EPC. Lastly, the EPC establishes a connection with the at least one user device and provides 5G services to the at least one user device via the gNodeB.

Another aspect of the present invention relates to a system for providing 5G services to at least one user device. The system comprises a gNodeB, an interworking unit and an EPC. The gNodeB is configured to receive a first connection request from the at least one user device. The gNodeB is also configured to attach a first protocol message to the first connection request received from the at least one user device and transmits the attached first connection request to an interworking unit. The interworking unit is configured to generate a third request from the attached first connection request based on an application protocol and to transmits the generated third request to an EPC. The EPC is configured to establish a connection with the at least one user device and to provide 5G services to the at least one user device via the gNodeB.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that invention of such drawings includes invention of electrical components or circuitry commonly used to implement such components.

DESCRIPTION OF INVENTION

Figure 1:
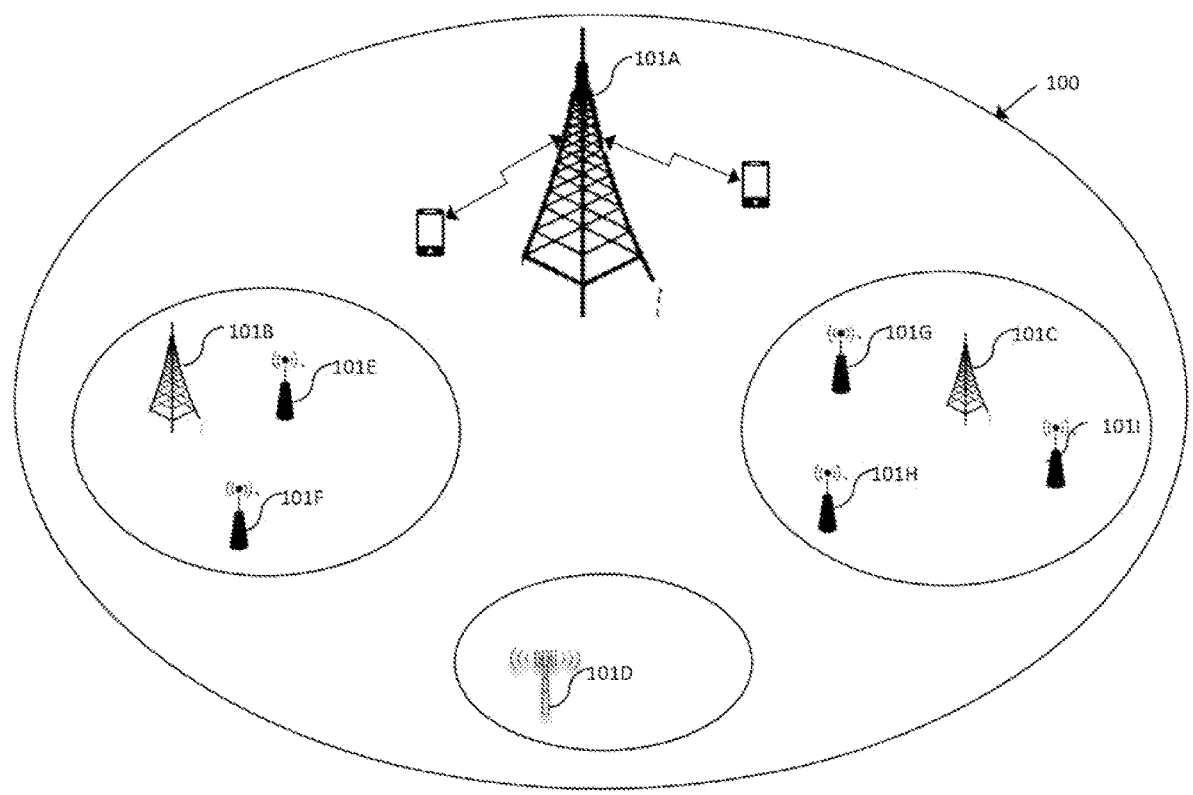
FIG. 1 illustrates an exemplary block diagram representation of a communication network architecture [100], in accordance with exemplary embodiments of the present invention.

In the following description, for the purposes of explanation, various specific details are set forth in order to provide a thorough understanding of embodiments of the present invention.

It will be apparent, however, that embodiments of the present invention may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the invention. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infers" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, "user device" or "user equipment", "mobile station," "mobile subscriber station," "access terminal," "terminal," "handset," "computing device," and similar terminology refers to any electrical, electronic, electromechanical and computing wireless device utilized by a subscriber or user of a wireless communication service to receive and/or convey data associated with voice, video, sound, and/or substantially any data-stream or signalling-stream. Further, the foregoing terms are utilized interchangeably in the subject specification and related drawings. The user device is capable of receiving and/or transmitting one or parameters, performing function/s, communicating with other user devices and transmitting data to the other user devices. The user device may have a processor, a display, a memory unit, a battery and an input-means such as a hard keypad and/or a soft keypad. The input interface also comprises touch/acoustic/video components for touch/sound/video input and output. The output interface may comprise a microphone, a speaker, camera and additionally audio/video 1/O ports in an accessories interface, wherein the speaker normally serves to provide acoustic output in the form of human speech, ring signals, music, etc. The user device may be capable of operating on any radio access technology including but not limited to IP-enabled communication, Zig Bee, Bluetooth, Bluetooth Low Energy, Near Field Communication, Z-Wave, NB-IoT etc. For instance, the user devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other device as may be obvious to a person skilled in the art.

Furthermore, the terms "user," "subscriber," "customer," "consumer," "agent,", "owner", "client" and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present invention. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. 'Computer storage media' refers to volatile and non-volatile, removable and non-removable media implemented in any method or technology for storage of information, such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present invention. More specifically, the controller or control unit is a hardware processor that comprises a memory and a processor. The memory is configured to store the modules and the processor is specifically configured to execute said modules to perform one or more processes which are described further below.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Currently, in the 5G (NR) deployment scenario, when a particular user device (for e.g., services availed on the user device) demand higher throughput than the presently offered capability of the eNodeB (eNB), the eNB decides to add the en-gNodeB (gNB) as a secondary node for that user device to fulfill the user device's demand. Hence, the eNB triggers the en-gNB (for e.g., the Xx based secondary node) for additional preparation procedure and creates an en-gNB context for the user device to reconfigure the user device to connect with the en-gNB. In such scenario, the LTE eNB is the deciding entity to add the en-gNB. For instance, if the eNB has a capacity to support 900 connected user devices, then the eNB can deploy the en-gNB as a secondary node for all the 900 connected user devices to enhance the throughput of the 900 connected user devices. Resultantly, the said mechanism improves the quality-of-service (QoS) for the 900 connected user devices if they all support 5G NR but this will not add additional subscribers for the operator.

In such scenarios, for the telecommunication operators, restrictions in adding subscriber base to the en-gNB is currently allowable using the Option-3/3A/3X 5G deployment mode, as specified by the 3GPP. In operation, for a user device (say UD1) connected with the eNB and the Evolved Packet Core (EPC), the UD1 context gets created in the eNB upon successful completion of the RRC connection establishment procedure. Also, a UD1 MME context gets created at the MME of the EPC upon the successful completion of the appropriate Non-Access Stratum (NAS) procedure. The signaling load on the eNB when implementing 5G NR in non-standalone (NSA) mode results in heavy signal load compared to the existing cell capacity. The Dual Connectivity further adds to signaling load (for instance, in certain scenarios, adding up to an additional 10%) due to the initial space deployment of 5G NR cells and the associated secondary cell addition/deletion procedures, for instance, RRC signaling load due to bursty data.

For instance, while implementing 5G NR in the NSA mode, the uplink data can be heavy and bursty, thus, increasing the associated cost on the Physical Uplink Control Channel (PUCCH). To accommodate the said issue in implementation, two known types of 5G NR device penetration, namely, fixed device penetration and mobility device penetration are used. The fixed devices penetration provides proportional increase in signaling load i.e. a 20% load on a 5G NR cell is expected to increase LTE signaling load by ~25 (Major impact being on the LTE Uu and the S1-MME Signaling), 5% overhead due to busty data. On the other hand, the mobility devices penetration provides a 20% load on a 5G NR cell is expected to increase LTE signaling load by 30-35%. LTE Uu, S1-MME impacted by Dual Connectivity signaling (assuming modest switching). Thus, while some of the above signaling load instances can be compensated, a 5G NR cell in never fully loaded due to signaling limitations in an LTE cell.

To consider an early deployment of the stand-alone (SA) option, the NG Core is yet to mature. The cost considerations are also heavy due to many new core elements. The dependency on the Management and Network Orchestration (MANO) specification derived from the IETF and ETSI specifications along with multiple other gaps as listed below could mean that operators would not consider a SA option (involving a fully functional 5GC) in the near future. Firstly, a single Service Orchestration Manager (SOM) product to support multi-domain service orchestration; Centralized policy management and enforcement. Secondly, a dynamic inventory management, to provide real-time visibility into the network and IT. Thirdly, cross-domain orchestration, typically, orchestrators focus on their own contained domain, such as content delivery networks (CDNs), mobile backhaul, IP VPNs, and so on. For NFV/SDN to reach its full potential, orchestration will need to break down these silos and happen across these domains. The current systems lack an "orchestrator of orchestrators" that has an end-to-end view of the network.

Therefore, in the current system, there exists a major challenge to provide support to the 5G NR NSA deployment which would use a fully functional 5G NR "Radio" catering to both data and signaling independently but connected to the existing 4G EPC core. Currently, there is no system and method available for this scenario of 5G NR NSA deployment.

Accordingly, the present invention provides method(s), and system(s) to provide 5G services to at least one user device by supporting the 5G NR deployment "Option 6" which would use a fully functional 5G NR "Radio" catering to both data and signaling independently but connected to the existing 4G EPC core, to realize the 5G NR Stand-Alone mode of deployment Option-6 by using the availability of the LTE and 5G NR Non-Access Stratum in a device to switch to a 5G NR node but also use as a 4G LTE EPC.

Referring to FIG. 1 illustrates an exemplary block diagram representation of a heterogeneous communication network architecture [100], in accordance with exemplary embodiments of the present invention. As shown in FIG. 1, the heterogeneous wireless communication network [100] comprises of a macro base station [101A] wide-area overlay mobility coverage, and one or more micro base station [101B, 101C] further connected to Wi-Fi access points [101E, 101F, 101G, 101H, 101I], and a micro base station [101D] with built-in Wi-Fi access point capability. The wireless communication network may include a local wireless communication site (or base station), which can use a licensed radio spectrum operated and controlled by a wireless service provider. In another instance of the present invention, the network may be a wired network, a wireless network, or a combination thereof. The network may be a single network or a combination of two or more networks.

The system of the present invention for providing 5G services to at least one user device [302, 502] comprises a gNodeB [304, 504], an interworking unit [306, 606], an EPC [308, 608], all components connected to each other and working in conjunction with each other to achieve the objectives of the present invention. The gNodeB [304] is configured to receive a first connection request from the at least one user device [302]. For instance, the first connection request is at least one of an attach request, an RRC connection request and a registration request. The gNodeB [304] is further configured to attach a first protocol message to the first connection request received from the at least one user device [302]. For instance, the first protocol message is based on non-access stratum (NAS) protocol. The gNodeB [304] is further configured to transmit the attached first connection request to an interworking unit [306]. In an instance of the present invention, the gNodeB [304] is further configured to broadcast a system information message to the at least one user device [302], wherein the system information message comprises of one or more bits to indicate a connection between the gNodeB [304] and the EPC [308].

The interworking unit [306] is configured to generate a third request from the attached first connection request based on an application protocol, and to transmit the generated third request to an EPC [308]. For instance, the application protocol is an S1 Application Protocol. In an instance of the present invention, the interworking unit [306] is further configured to maintain a connection status between the gNodeB [304] and the EPC [308]. Accordingly, the interworking unit [306] is further configured to determine a type for the first connection request received from at least one user device [302], and to transmit a rejection message to the at least one user device [302] based on the determined type of the first connection request and connection status.

The EPC [308] is configured to establish a connection with the at least one user device [302], and to provide 5G services to the at least one user device [302] via the gNodeB [304]. The EPC [308] is further configured to transmit an acceptance message to the at least one user device [302] in response to the first connection request. The said system is described in detail with reference to FIG. 3 and FIG. 5.

Figure 2:
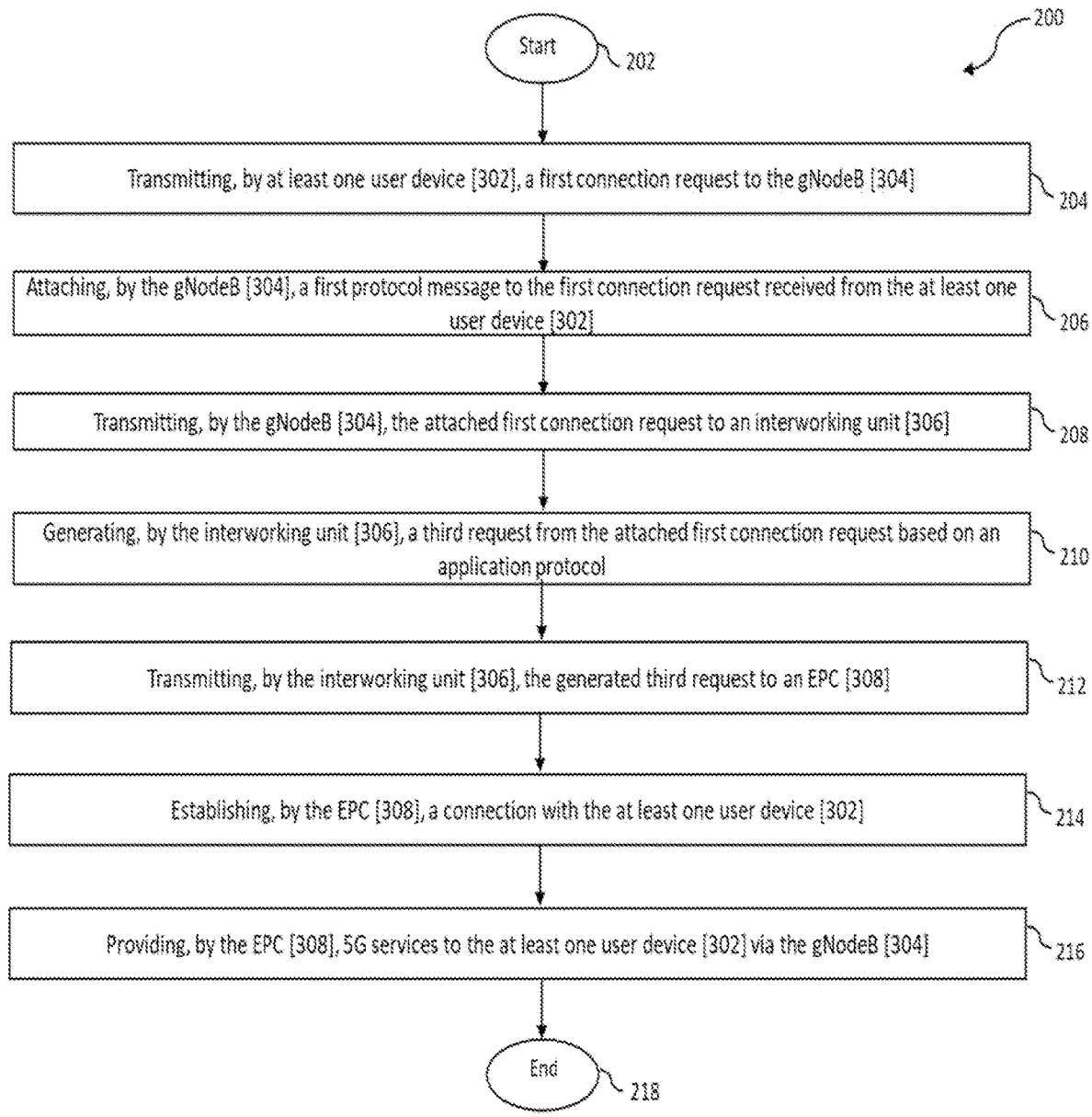
FIG. 2 illustrates an exemplary method flow diagram depicting a method [200] for providing 5G services to at least one user device, in accordance with exemplary embodiments of the present invention.

Referring to FIG. 2 illustrates an exemplary method flow diagram depicting a method [200] for providing 5G services to at least one user device, in accordance with exemplary embodiments of the present invention. The method starts at step [202]. At step [204], the at least one user device [302] transmits a first connection request to the gNodeB [304]. At step [206], the gNodeB [304] attaches a first protocol message to the first connection request received from the at least one user device [302] and, at step [208], the gNodeB [304] transmits the attached first connection request to an interworking unit [306]. At step [210], the interworking unit [306] generates a third request from the attached first connection request based on an application protocol. At step [212], the interworking unit [306] transmits the generated third request to an EPC [308].

At step [214], the EPC [308] establishes a connection with the at least one user device [302]. The method further encompasses transmitting, by the EPC [308], an acceptance message to the at least one user device [302] in response to the first connection request. At step [210], the EPC [308] provides 5G services to the at least one user device [302] via the gNodeB [304]. The method completes at step [216].

The present invention further encompasses broadcasting a system information message by the gNodeB [304] to the at least one user device [302], wherein the system information message comprises of one or more bits to indicate connection between the gNodeB [304] and the EPC [308]. Accordingly, the at least one user device [302] transmits the first connection request to the gNodeB [304] further comprises selecting a 5G communication protocol based on the system information message. The said method of the present invention is described in detail in the reference to FIG. 4.

The present invention further encompasses maintaining, by the interworking unit [306], a connection status between the gNodeB [304] and the EPC [308]. Accordingly, the interworking unit [306] generates the attached first connection request based on an application protocol by, firstly, determining a type for the first connection request received from at least one user device [302], and secondly, transmitting a rejection message to the at least one user device [302] based on the determined type of the first connection request and connection status. The said method of the present invention is described in detail in the reference to FIG. 6.

Figure 3:
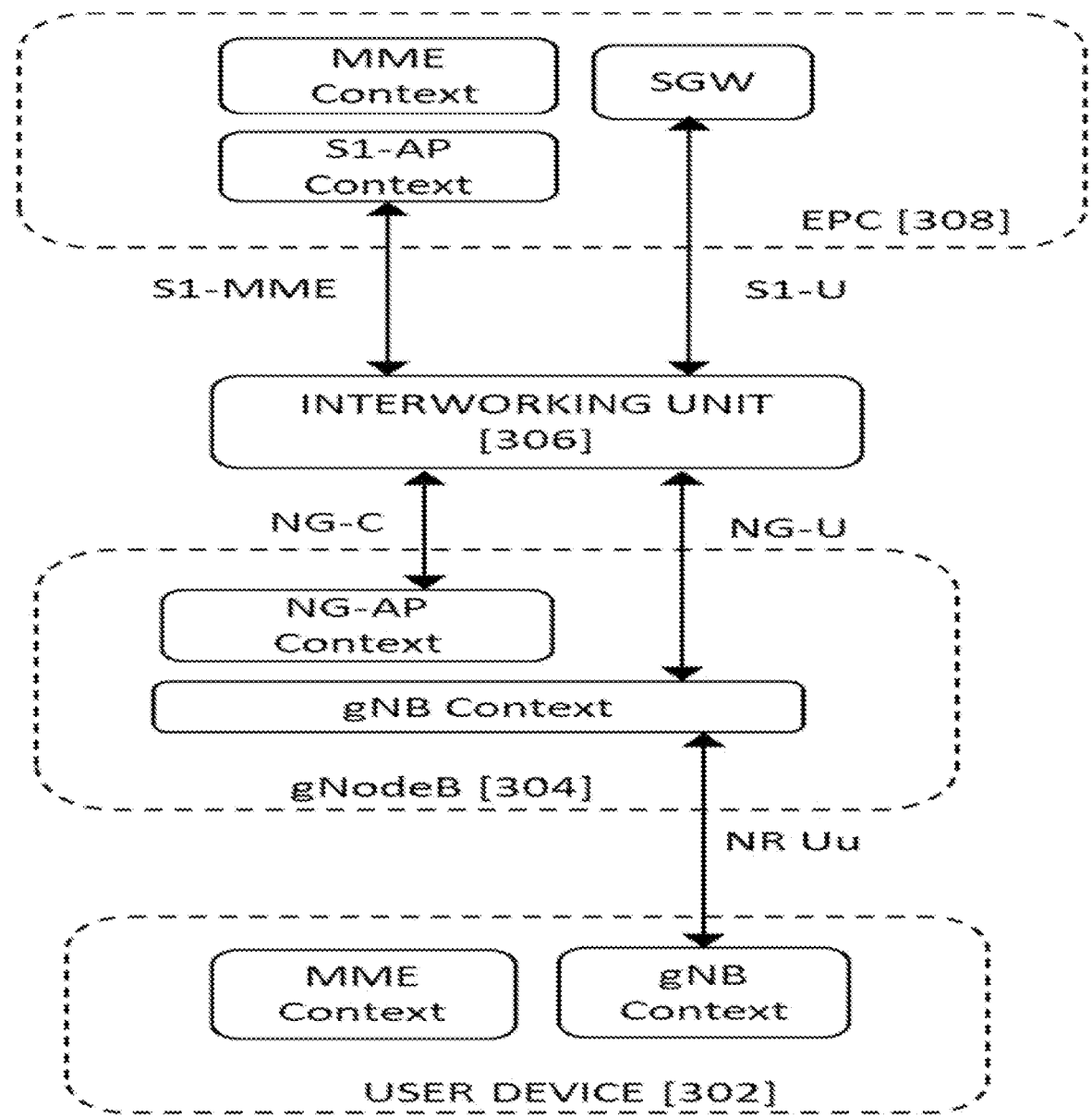
FIG. 3 illustrates an exemplary block diagram representation of a system [300] for providing 5G services to at least one user device via a gNodeB, in accordance with exemplary embodiments of the present invention.

Referring to FIG. 3 illustrates an exemplary block diagram representation of a system [300] for providing 5G services to at least one user device via a gNodeB, in accordance with exemplary embodiments of the present invention. It represents an exemplary deployment of the Option-6 architecture, where the gNB [304] is connected to the EPC [508] via the interworking unit [506]. The present invention encompasses standalone operational mode for the gNodeB [304]. The user device [302] provides its' gNB context (say, signaling request) to the gNB [304] via the NR Uu interface. The gNB [304] receives the gNB context of the user device [302] via the NR Uu interface. The gNB [304] provides a NG-AP context to the interworking unit [306] via the NG-C interface. The interworking unit [306] receives NG-AP context, generates a third context based on the S1 Application Protocol, and provides the third context via the S1-MME and the S1-U interfaces to the EPC [308]. Since the gNB [304] supports NG interface towards the core network whereas the EPC [308] does not possess the capability for processing the NG protocol, therefor the interworking unit [306] acting between gNB and the EPC, generates an S1-AP context based request from the NG-AP protocol based request and vice-versa.

Figure 5:
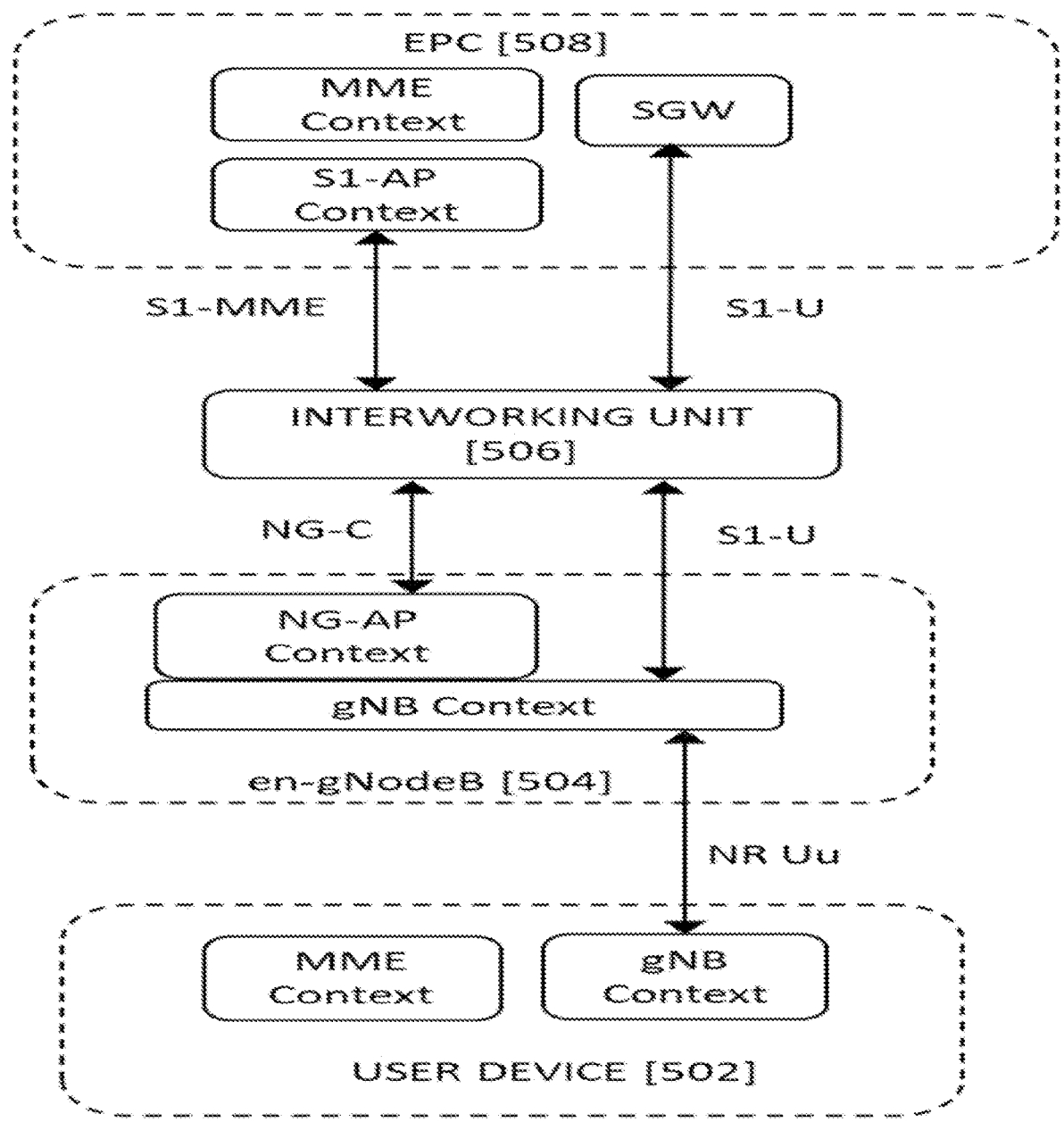
FIG. 5 illustrates an exemplary block diagram representation of a system [300] for providing 5G services to at least one user device via an en-gNodeB, in accordance with exemplary embodiments of the present invention.

Referring to FIG. 5 illustrates an exemplary block diagram representation of a system [500] for providing 5G services to at least one user device via an en-gNodeB, in accordance with exemplary embodiments of the present invention. It represents an exemplary deployment Option-6A architecture, where the en-gNB [504] is connected to the EPC [508] via the interworking unit [506]. The present invention encompasses interim standalone operational mode for the gNodeB [504]. The user device [502] provides its' en-gNB context (say, signaling request) to the en-gNB [504] via the NR Uu interface. The en-gNB [304] receives the gNB context of the user device [502] via the NR Uu interface. The en-gNB [504] provides an NG-AP context to the interworking unit [506] via the NG-C interface. The en-gNB [504] provides the gNB context to the interworking unit [506] via the S1-U interface. The interworking unit [506] receives the NG-AP context and the gNB context, generates a third context based on the S1 Application Protocol, and provides the third context via the S1-MME interface to the EPC [508]. The interworking unit [506] provides the gNB context to the EPC [508] via the S1-U interface. The en-gNB [504] is connected to the EPC [508]. Since the en-gNB [504] supports only S1-U and the NAS signaling flows via eNB's S1-AP, en-gNB [504] can either support S1-MME interface or NG-C to get connected to the EPC [508]. If it supports NG-C interface, then the connectivity to the EPC [508] is similar to Option-6 described with reference to FIG. 3. Else, the interworking unit [506] will act either as transparent entity, since the en-gNB [504] is supporting S1 interface itself, which can be directly connected to the EPC [508].

Figure 4:
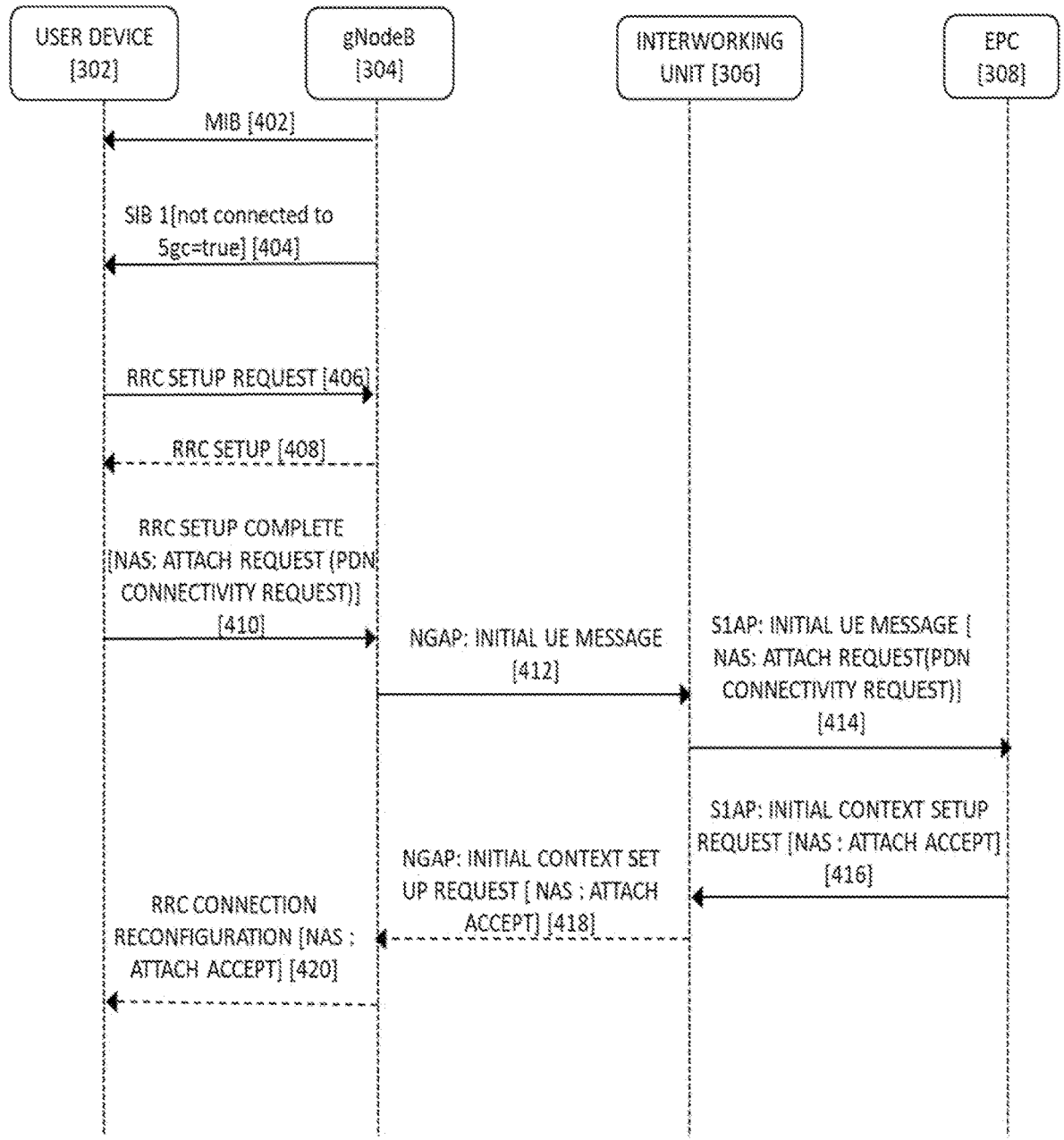
FIG. 4 illustrates an exemplary signal flow diagram depicting a method for providing 5G services to at least one user device, in accordance with exemplary embodiments of the present invention.

Referring to FIG. 4 illustrates an exemplary signal flow diagram depicting a method for providing 5G services to at least one user device for the system of FIG. 3, in accordance with exemplary embodiments of the present invention. The gNB [304] is connected to the EPC [308]. In operation, since the user device [302] sees gNB [304] as a 5G base station, the user device [302] camps on to these 5G cells, it normally activates the 5G NAS to register or to request for any services with the Core Network. At the infrastructure side, these base stations are connected to the EPC [308] operating on the 4G NAS, and the EPC [308] is not capable of understanding the 5G NAS. Hence, the user device [302] is unable to register or access any service through the gNodeB [304]. So, to assist the user device [302] to get registered and to get all 5G Services, the gNB [304] broadcasts a flag in the system information broadcast message (the SIB1), indicating that the base station is connected to the EPC [308]. For instance, a new Information Element "notConnectedTo5gc" is introduced into the RRC SIB1. Accordingly, the user device [302], during the cell selection and cell reselection, reads the SIB1 message, and chooses a NAS protocol based on the "notConnectedTo5gc" information element. If the information element is set to 'true', the user device [302] chooses 4G NAS protocols for communication with the core network else, it chooses 5G NAS.

In the exemplary method flow of FIG. 4, the user device [302] is in RRC Idle mode. The user device [302] receives a master information broadcast [MIB] at step [402], and a system information broadcast [SIB] at step [404]. Subsequently, the user device [302] decides to camp onto the gNodeB [303] and sends an RRC connection setup request at step [406]. After camping on to this cell upon successful RRC connection setup at step [408], the user device [302] chooses 4G NAS to communicate with the core network and decides to get connected with the Network. The user device transmits an RRC setup complete request, which carries the 4G NAS attach request, to the gNodeB [304]. The gNodeB [304] processes the 4G NAS and, at step [412], transmits the 4G NAS attach request to the interworking unit [306] along with a NG-AP message. The interworking unit [306] generates a S1AP message from the 4G NAS attach request and the NG-AP message. At step [414], the interworking unit [306] transmits the S1-AP message to the EPC [308]. At step [416], the EPC [308] transmits the S1-AP initial context setup request message which carries the 4GNAS message attach accept to the interworking unit [306]. the 4GNAS message will be carried in the S1AP message as NAS-PDU. At step [418], the interworking unit [306] transmits the NG-AP initial context setup request message to the gNodeB [304]. The NAS-PDU received from the S1-AP message is transparently mapped to the NG-AP message. This NAS-PDU includes attach accept message. At step [418] the gNodeB [304] transmits the NAS attach accept message to the user device [302].

Figure 6:
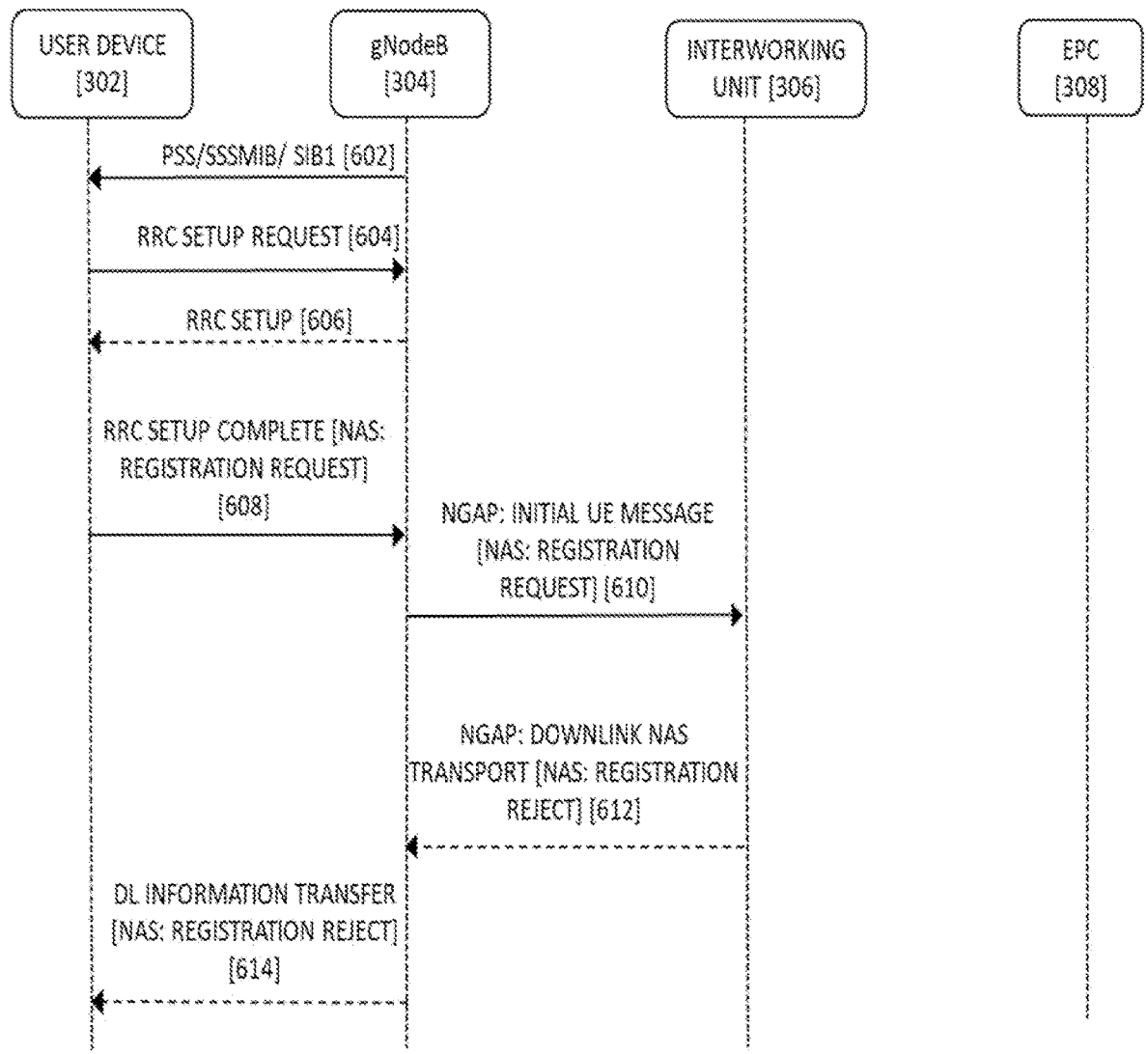
FIG. 6 illustrates another exemplary signal flow diagram depicting a method for providing 5G services to at least one user device, in accordance with exemplary embodiments of the present invention.

Referring to FIG. 6 illustrates an exemplary signal flow diagram depicting a method for providing 5G services to at least one user device for the system of FIG. 5, in accordance with exemplary embodiments of the present invention. When the user device [302] wishes to register with the network, it reads the PSS, SSS, MIB and SIB1 and determines that the gNB [304] is a 5G cell. Then, the user device chooses 5G NAS and triggers the registration procedure as per 5G NAS.

When the user device sends registration request message towards the Core Network, the interworking unit [306] decodes the registration request message. Since the gNB/en-gNB [304, 504] is connected to EPC [308] via the interworking unit [306], the interworking unit [306] itself rejects the registration procedure. Hence, a 5GMM Cause Value "Protocol error, 5GC Not allowed" is proposed in the 5G NAS Protocol. When the interworking unit [306] decides to reject the registration request message from the user device, it prepares a registration reject message with the cause value as "Protocol error, 5GC Not allowed" and sent towards the user device via gNB/en-gNB [304, 504]. When the user device receives this reject message and when it reads the cause value, it will decide to switch to 4G NAS and again trigger the Attach procedure to attach with the network.

The user device [302] receives a master information broadcast [MIB], a primary synchronization signal, or a system information broadcast [SIB] at step [602]. Subsequently, the user device [302] decides to camp onto the gNodeB [303] and sends an RRC connection setup request at step [604]. After camping on to this cell upon successful RRC connection setup at step [606], the user device [302] chooses 5G NAS to communicate with the core network and decides to get connected with the Network. The user device transmits an RRC setup complete message carrying the NAS registration request message to the gNodeB [304] at step [608]. The gNodeB [304] processes the 5G NAS and, at step [610], transmits the 5G NAS registration request to the interworking unit [306] along with an NG-AP message. The interworking unit [306] detects that the NAS-PDU in the received NG-AP message belongs to 5G NAS, and prepares the NAS registration reject with the cause information element set to "Protocol error, 5GC not allowed". At step [612] the interworking unit [306] transmits the NAS registration reject to the gNB [304]. At step [614] the gNB [304] transmits the NAS registration reject to the user device [302].

Figure 7A:
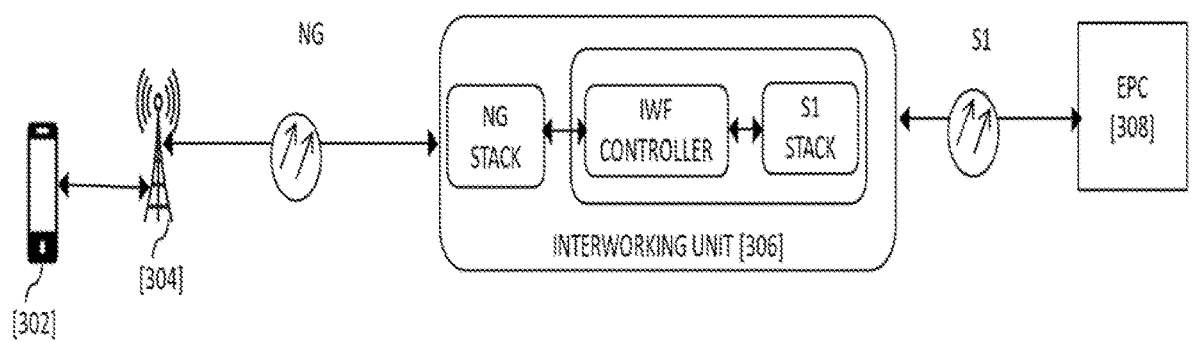
FIG. 7A illustrates exemplary deployment of the interworking unit as an independent node in the system for providing 5G services to at least one user device, in accordance with exemplary embodiment of the present invention.

Referring to FIG. 7 illustrates exemplary deployment of the interworking unit in the system for providing 5G services to at least one user device, in accordance with exemplary embodiment of the present invention. The present invention encompasses that the interworking unit [306] can be deployed as an independent node, co-located with the gNB [304], or co-located with the EPC [308]. Referring to FIG. 7A illustrates exemplary deployment of the interworking unit as an independent node in the system for providing 5G services to at least one user device, in accordance with exemplary embodiment of the present invention. The interworking unit [306] is deployed as an independent node. The interworking unit [306] further comprises shall of an NG interface stack, to interface with gNB [304], S1 interface stack to interface with both the EPC [308] and the gNB [304], and an IWF controller to decode the NAS message. Being an independent node, the interworking unit [306] provides services to multiple gNB/en-gNB [304, 504], and referred to as EPC/5GC IWF Aggregation Point.

Figure 7B:
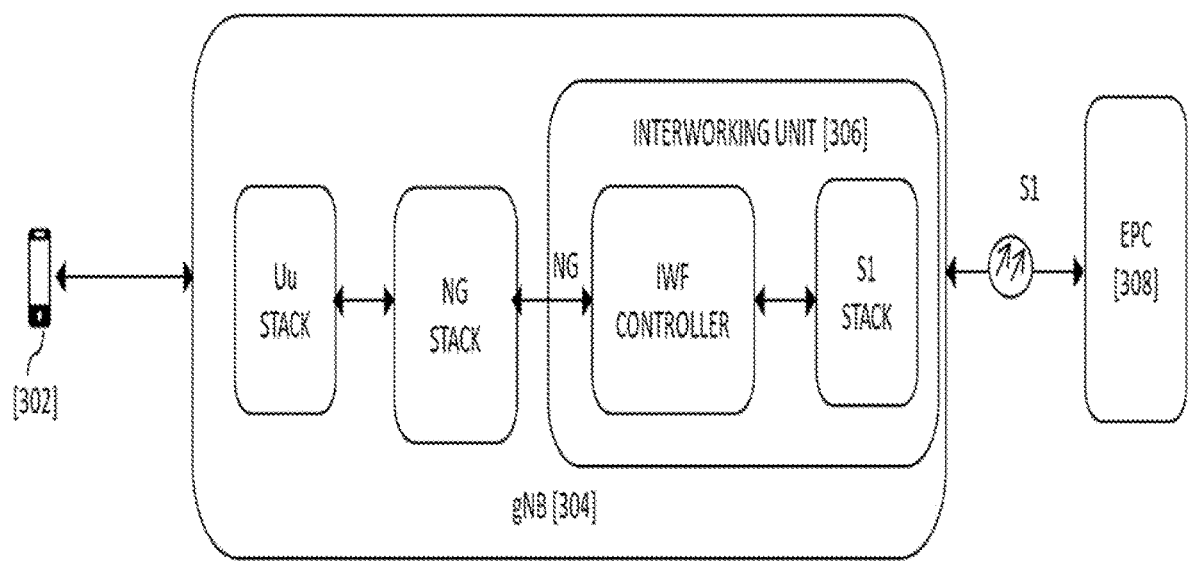
FIG. 7B illustrates exemplary deployment of the interworking unit collocated with gNB/en-gNB in the system for providing 5G services to at least one user device, in accordance with exemplary embodiment of the present invention.

Referring to FIG. 7B illustrates exemplary deployment of the interworking unit collocated with gNB/en-gNB in the system for providing 5G services to at least one user device, in accordance with exemplary embodiment of the present invention. The interworking unit [306] is part of the gNB/en-gNB [304, 504], thus, the interworking unit [306] needs to support only S1 stack in case of gNB [304] as gNB within itself includes NG Interface stack. Similarly, the interworking unit [306] needs to support as transparent entity in case of en-gNB [504], as it en-gNB [504] is going to support S1 interface stack within itself and also the interworking unit [306] shall use the same stack while communicating with EPC. The rest of the functions of interworking unit [306] remains same in-line with the independent node case.

Figure 7C:
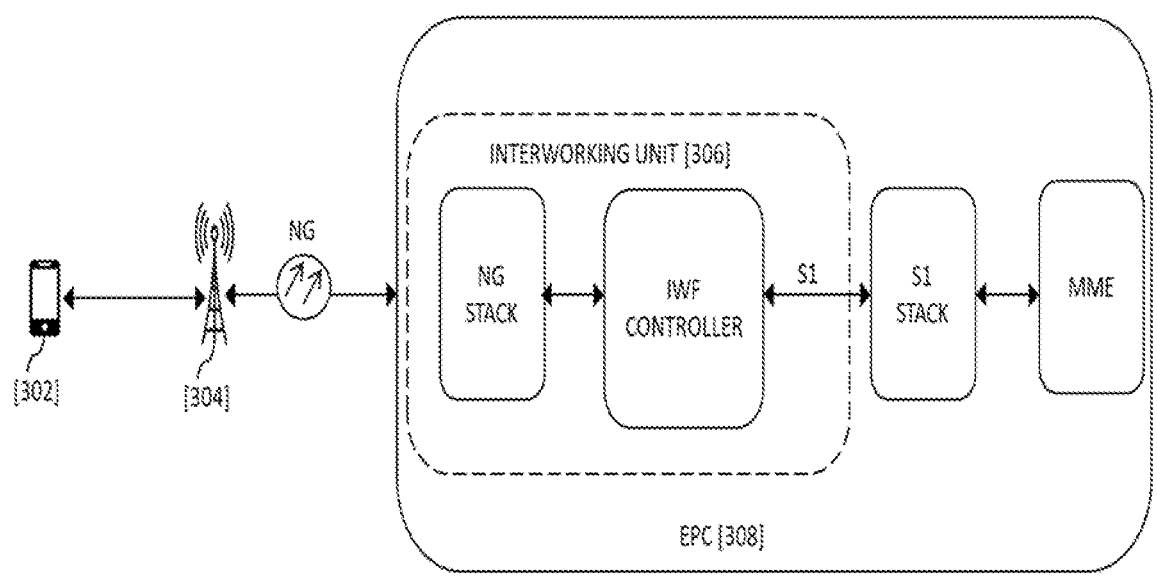
FIG. 7C illustrates exemplary deployment of the interworking unit collocated with gNB/en-gNB in the system for providing 5G services to at least one user device, in accordance with exemplary embodiment of the present invention. The foregoing shall be more apparent from the following more detailed description of the invention.

Referring to FIG. 7C illustrates exemplary deployment of the interworking unit collocated with gNB/en-gNB in the system for providing 5G services to at least one user device, in accordance with exemplary embodiment of the present invention. The interworking unit [306] is part of the EPC [306] itself, thus, the interworking unit [306] needs to support only NG stack in case of gNB [304] as the EPC [308] within itself includes the S1 Interface stack. The interworking unit [306] supports as transparent in case of en-gNB [504] as the en-gNB [504] supports the S1 interface stack within itself and the interworking unit [306] uses the same S1 stack which the EPC [308] already supports while communicating with the EPC [308] and the en-gNB [504]. The rest of the functions of interworking unit [306] remains same in-line with the independent node case.

Thus, the present invention provides a novel solution for providing support to the 5G NR NSA deployment which would use a fully functional 5G NR "Radio" catering to both data and signaling independently but connected to the existing 4G EPC core. The present invention also provides a mechanism to assist the user device during the camping on to the 5G cell, to detect whether the gNB/en-gNB is connected to EPC or a 5G Core. After detection, the user device chooses the right NAS entity at the device side to work in a Stand-Alone 5G NR mode that uses the EPC.

It shall be appreciated by any person skilled in the art, and from the preceding description of the present invention, that the present invention may be implemented in any type of communication device. While the implementation of the solution of the present invention has been discussed to a very few usages including, the invention may also be used in many other applications that may be known to a person skilled in the art, all of which are objectives of the present invention.

The interface, module, memory, database, processor and component depicted in the figures and described herein may be present in the form of a hardware, a software and a combination thereof. The connection shown between these components/module/interface in the system [100] are exemplary, and any components/module/interface in the system [100] may interact with each other through various logical links and/or physical links. Further, the components/module/interface may be connected in other possible ways.

Though a limited number of servers, gateways, user equipment, wireless network, interface, module, memory, database, processor and component have been shown in the figures, however, it will be appreciated by those skilled in the art that the overall system of the present invention encompasses any number and varied types of the entities/elements such as servers, gateways, user equipment, wireless network, interface, module, memory, database, processor and any other component that may be required by a person skilled in the art to work the present invention.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:
1. A method for providing 5G services to at least one user device [302], the method comprising:
   transmitting, by at least one user device [302], a first connection request to the gNodeB [304];
   attaching, by the gNodeB [304], a first protocol message to the first connection request received from the at least one user device [302];
   transmitting, by the gNodeB [304], the attached first connection request to an interworking unit [306];
   generating, by the interworking unit [306], a third request from the attached first connection request based on an application protocol;
   transmitting, by the interworking unit [306], the generated third request to an EPC [308];
   establishing, by the EPC [308], a connection with the at least one user device [302]; and
   providing, by the EPC [308], 5G services to the at least one user device [302] via the gNodeB [304].

2. The method as claimed in claim 1, wherein establishing a connection with the at least one user device [302] by the EPC [308] further comprises transmitting, by the EPC [308], an acceptance message to the at least one user device [302] in response to the first connection request.

3. The method as claimed in claim 1, the method further comprising broadcasting a system information message by the gNodeB [304] to the at least one user device [302], wherein the system information message comprises of one or more bits to indicate connection between the gNodeB [304] and the EPC [308].

4. The method as claimed in claim 3, wherein transmitting, by the at least one user device [302], the first connection request to the gNodeB [304] further comprises selecting a 5G communication protocol based on the system information message.

5. The method as claimed in claim 1, further comprising maintaining, by the interworking unit [306], a connection status between the gNodeB [304] and the EPC [308].

6. The method as claimed in claim 5, wherein generating, by the interworking unit [306], the attached first connection request based on an application protocol further comprises:
   determining a type for the first connection request received from at least one user device [302]; and
   transmitting a rejection message to the at least one user device [302] based on the determined type of the first connection request and connection status.

7. The method as claimed in claim 1, wherein
   the first connection request is at least one of an attach request, an RRC connection request and a registration request,
   a first protocol message is based on non-access stratum (NAS) protocol, and
   the application protocol is an S1 Application Protocol.

8. The method as claimed in claim 1, wherein the gNodeB [304] is an en-gNodeB.

9. A system for providing 5G services to at least one user device [302], said system comprising:
   a gNodeB [304] configured to:
      receive a first connection request from the at least one user device [302], attach a first protocol message to the first connection request received from the at least one user device [302], and transmit the attached first connection request to an interworking unit [306];

the interworking unit [306] connected to the gNodeB [304], said interworking unit [306] configured to:

generate a third request from the attached first connection request based on an application protocol, transmit the generated third request to an EPC [308]; and the EPC [308] connected to the interworking unit [306] and the gNodeB [304], said EPC [308] configured to:

establish a connection with the at least one user device [302], and provide 5G services to the at least one user device [302] via the gNodeB [304].

10. The system as claimed in claim 9, wherein the EPC [308] is further configured to transmit an acceptance message to the at least one user device [302] in response to the first connection request.

11. The system as claimed in claim 9, wherein the gNodeB [304] is further configured to broadcast a system information message to the at least one user device [302], wherein the system information message comprises of one or more bits to indicate a connection between the gNodeB [304] and the EPC [308].

12. The system as claimed in claim 9, wherein the interworking unit [306] is further configured to maintain a connection status between the gNodeB [304] and the EPC [308].

13. The system as claimed in claim 12, wherein the interworking unit [306] is further configured to:

determine a type for the first connection request received from at least one user device [302]; and transmit a rejection message to the at least one user device [302] based on the determined type of the first connection request and connection status.

14. The system as claimed in claim 9, wherein the first connection request is at least one of an attach request, an RRC connection request and a registration request, a first protocol message is based on non-access stratum (NAS) protocol, and the application protocol is an S1 Application Protocol.

15. The system as claimed in claim 9, wherein the gNodeB [304] is an en-gNodeB.

* * * * *